United States Patent Office 3,232,457
Patented Feb. 1, 1966

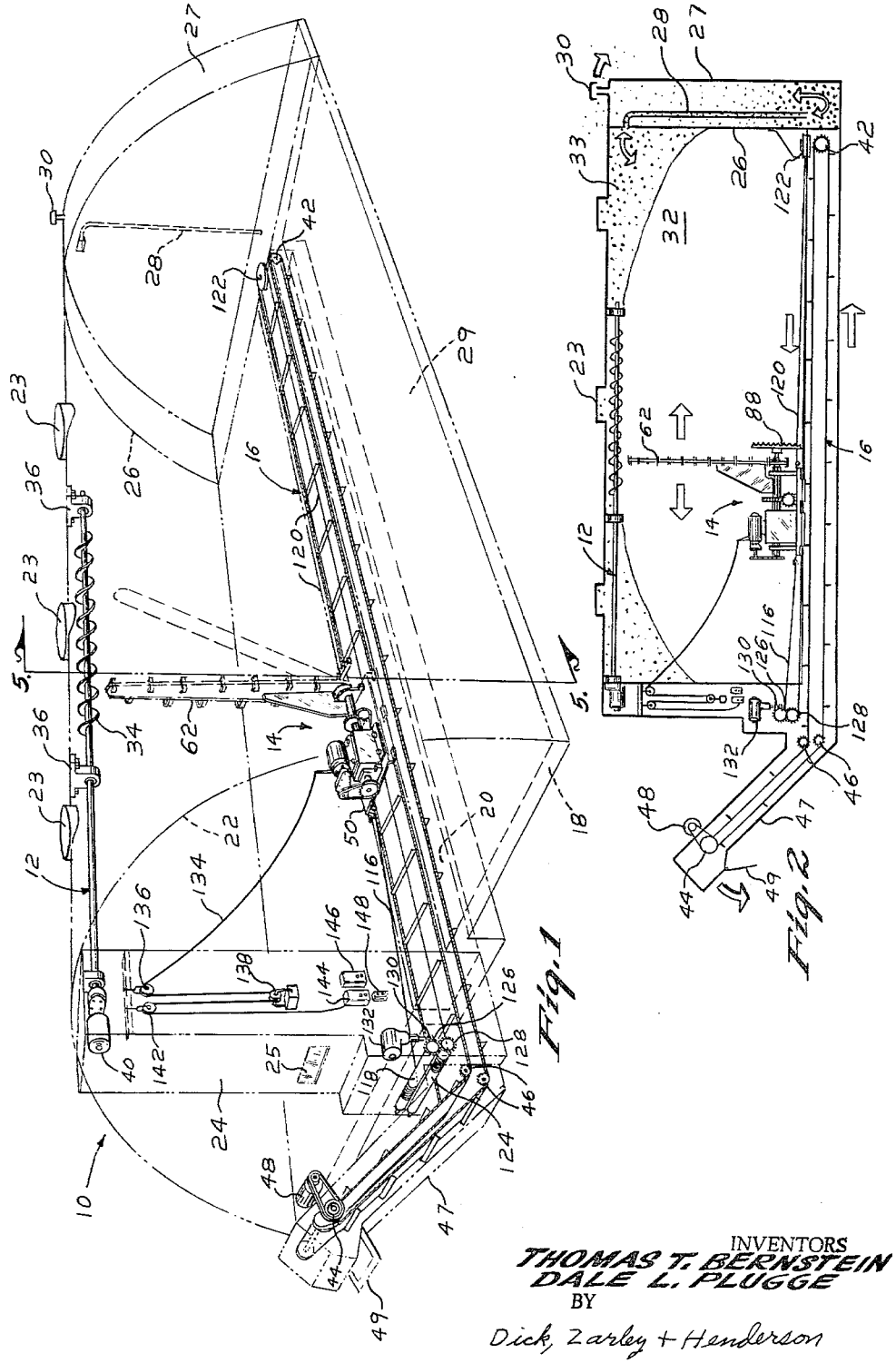

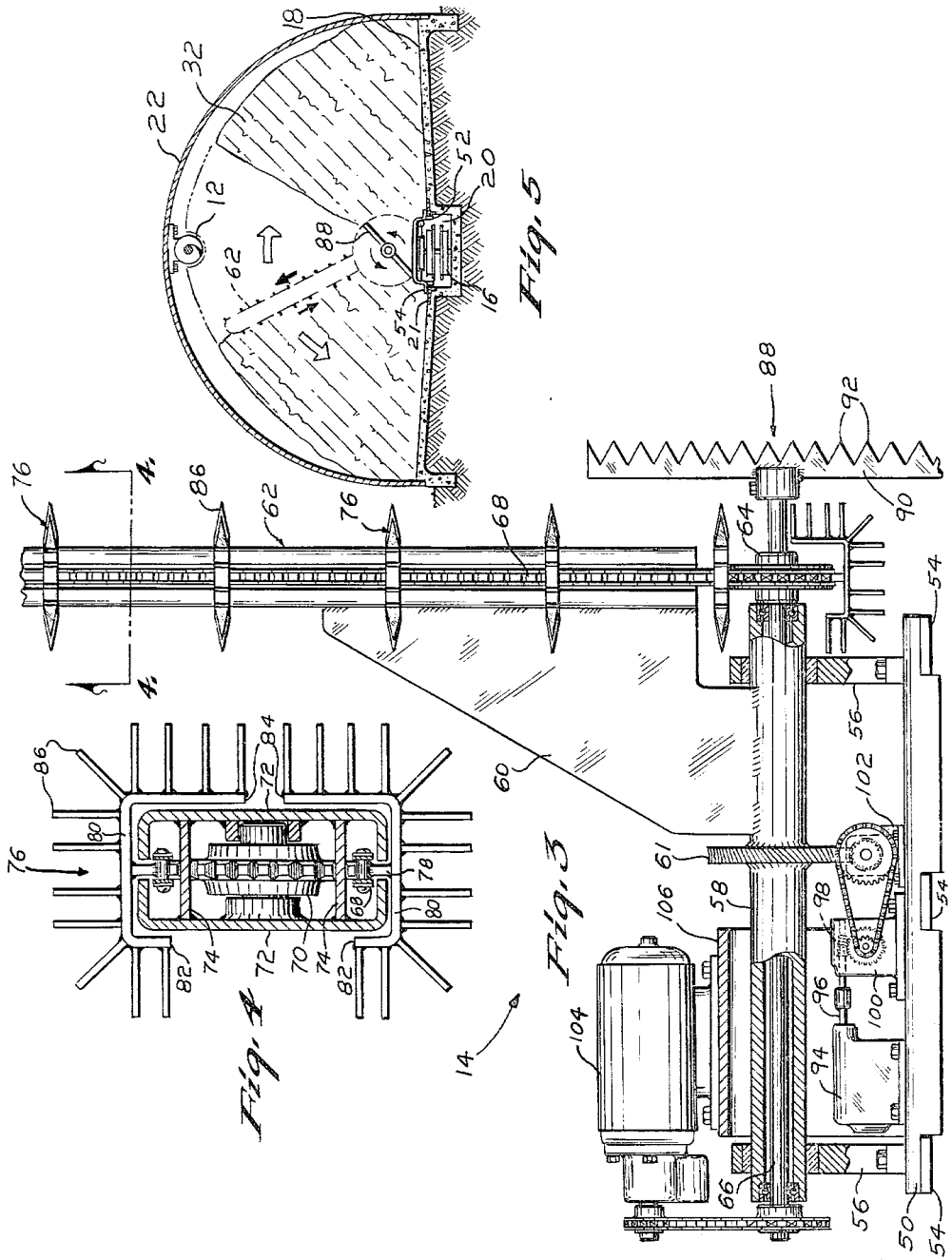

3,232,457
BULK MATERIAL STORAGE STRUCTURE AND
UNLOADING ASSEMBLY
Thomas T. Bernstein and Dale L. Plugge, Columbus,
Nebr., assignors to Behlen Manufacturing Company,
Inc., Columbus, Nebr., a corporation of Nebraska
Filed June 14, 1963, Ser. No. 287,808
11 Claims. (Cl. 214—17)

This invention relates to a bulk material storage and unloading system and in particular a structure which is easily filled with bulk material, which is safe for storage of the material, and from which the material may be easily removed.

Bulk material storage structures may be grouped into two classes, the horizontally disposed structures and the vertically constructed silo structure. While the low to the ground type of structures of the first group have many advantages and desirable features, they have presented several problems, one of which is completely filling the structure with bulk material. The conventional practice has been to move the input conduit successively from opening to opening along the length of the structure. This practice is time consuming and therefore not completely satisfactory. Removal of the material has been accomplished by several methods, one of which is by hand through a door opening in the structure. This procedure obviously leaves much to be desired. Another problem, one associated with all bulk material storage structures used for silage or the like, has been how to provide for the expanding and contracting silage gas which is necessary to protect the silage from the air, and still fully utilize all the space for storage of the silage. Since the silage gas has to move somewhere, the conventional practice has been to provide air vents in the structure for the gas to escape to the outside. However, in turn this has exposed the silage to the outside air thereby causing undesirable mold in the silage.

Therefore it is an object of this invention to provide a bulk material storage structure which may be completely filled from one filling opening.

It is another object of this invention to provide a bulk material leveling device which will utilize a pile of bulk material as a support on which additional bulk material introduced into the storage structure will be moved to a vacant space in the storage structure.

It is another object of this invention to provide a bulk material storage structure wherein the bulk material is separated from the outside air by the gas produced by the bulk material.

It is another object of this invention to provide a bulk material storage structure wherein the silage gas or the like may expand into an auxiliary chamber if space is unavailable in the bulk material storage structure.

It is still a further object of this invention to provide a bulk material unloading assembly having a cutter and conveyor that cooperate to remove material from all points in the storage structure.

It is another object of this invention to provide a bulk material unloading assembly that will cut and convey bulk material both laterally and longitudinally of the storage structure.

It is a further object of this invention to provide a bulk material unloading assembly which may be controlled remotely and seen in operation from outside the storage structure.

A further object of this invention is to provide a bulk material storage structure and unloading assembly, which is simple in design, economical to manufacture and durable in use.

These and other objects and other features and advantages of this invention will become readily apparent upon reference to the following description when taken in conjunction with the accompanying drawings, wherein:

FIG. 1 is an elevation perspective phantom view of the storage structure illustrating the material leveling device, the cutter assembly and the material conveyor provided on the inside of the structure;

FIG. 2 is a side elevation view in schematic form of the storage structure and associated equipment on the inside of the structure;

FIG. 3 is a side elevation view of the cutter assembly with a portion broken away to more clearly illustrate its construction;

FIG. 4 is a cross-sectional view of the cutter arm, taken along line 4—4 in FIG. 3, illustrating one of the cutting implements carried by the cutter arm;

FIG. 5 is an elevation cross-sectional view of the storage structure taken along line 5—5 in FIG. 1 but with bulk material added to illustrate the cutter operation.

The bulk material storage structure is referred to generally in FIG. 1 by reference numeral 10. Major sub combinations in the structure 10 are the material leveling device 12, the cutter assembly 14 and the conveyor 16.

The storage structure 10 per se is comprised of a floor 18 which is provided centrally along its length with a channel shaped trench 20. Downwardly facing L-shaped bearing plates 21 extend along the upper channel edges and perform a function subsequently to be described. The floor 18 is enclosed by a semi-circular roof 22 which forms the sides of the structure and extends between opposite sides of the floor 18. Along a line extending the length of the roof 22 at its highest point, spaced filling openings 23 are provided. A control cubicle 24 is positioned at one end of the structure 10 and is provided with a viewing window 25 for observing the operation of the equipment on the inside. At the opposite end of the structure 10 a wall 26 closes off the end to form a chamber 27 having the same shape in cross-section as the main portion of the structure 10. A vertically extending tube 28 is centrally positioned in the chamber 27 and has one end which opens into the material storage area 29 at the top of the wall 26. The other end of the tube terminates just above the bottom floor of the chamber 27. A vent 30 opening to the outside is provided at the top of the chamber 27 in the outer wall of the structure 10.

As illustrated in FIGS. 2 and 5 the bulk material 32 or the like is added to the structure until it is very close to the top of the roof 22. This may be accomplished by funneling the material 32 through only one filling opening 23, the central one preferably, and distributing it to the ends of the structure by the use of the leveling device 12. Silage gas 33 occupies the space between the roof 22 and the material 32.

This device comprises an auger 34 secured to the top of the roof 22 by bearing mounts 36 which secure the auger directly below the center filling opening 23. One end is coupled to a reversible motor 40 which is located in the top of the control cubicle 24.

The conveyor 16 is positioned in the trench 20 and is flush with the surface of the floor 18. At the far end of the trench the endless conveyor extends around an idler sprocket and shaft means 42 and at the discharge end over shaft means 44. In the control cubicle, guide sprockets 46 engage the conveyor chains at the point where a portion 47 of the conveyor extends outwardly and upwardly of the structure 10 (FIG. 1) to a material discharge station. During operation of the conveyor 16, a motor 48 mounted on the upper end of conveyor portion 47 and coupled to sprocket 44 will supply the necessary power. When material 32 is being discharged from the conveyor portion 47, a door 49 is opened and at other times kept closed to prevent admittance of outside air to spoil the silage material 32.

The cutter assembly 14 is adapted to move the full length of the storage structure 10 directly above the trench channel 20. It is provided with an inverted channel support member 50 having legs 52 in abutting engagement with the side walls of the trench 20 (FIG. 5); guide support tabs 54 are formed from the channel legs 52 and extend perpendicular to the legs for supporting engagement with the bearing plates 21 at the top edges of the trench channel.

Bearing supports 56 are provided at opposite ends of the member 50 to pivotally support tube member 58. A brace member 60 is affixed to the top side of the tube 58 which is in turn secured to a cutter arm 62 extending at right angles to one end of the tube 58. Rotative power is supplied to the tube member 58 through a helical gear 61 in a manner to be later described.

A sprocket gear 64 is provided on the lower end of the cutter arm 62 and is rotatably coupled to a shaft 66 extending through the tube 58; an endless cutter chain 68 embraces the gear 64 at one end of the cutter arm 62 and a sprocket gear 70 at its other end (FIG. 4).

The cutter arm 62 is constructed from a pair of oppositely facing channel members 72 secured together in registering relationship by chain guide plates 74 (FIG. 4). Along the length of the cutter arm are provided cutting implements 76 uniformly spaced and secured to the chain 68 by an element 78. The cutting implements 76 have a base element 80 U-shaped in cross-section and in an embracing relationship to the cutter arm 62. The inside legs 82 are provided shorter in length than the outside legs 84 since the major portion of the cutting and clawing will be performed by the outside legs 84 which terminate adjacent the longitudinal axis of the cutter arm. Spaced along the outer side of each base element 80 are triangular shaped fingers 86 (FIGS. 3 and 4) which extend perpendicular thereto.

On the front side at the lower end of the cutter arm 62 a rotating cutter 88 is mounted on the outer end of shaft 66. The rotating cutter 88 is formed from a plate member 90 having its forward edge provided with cutting blades 92 triangular in shape and similar to those on a sickle used on farm mowers.

The power for indexing tube member 58 which carries cutter arm 62 is supplied by a motor 94 bolted to the channel support member 50. The motor 94 is coupled by a shaft 96 having a worm gear 98 at its free end to a speed reduction gear box 100. The gear box 100 is in turn coupled to a second speed reduction gear box 102 which drives the helical gear 61 on the tube member 58.

The chain 68 carrying cutting implements 76, as well as the rotating cutter 88, are both driven by a motor 104 which is chain coupled to one end of the shaft 66. The motor 104 is supported above the tube 58 and the motor 94 by a support member 106.

The cutter assembly 14 is moved along the storage structure 10 in the following manner. A cable 116 is connected at the inner end of the cutter assembly 14 and to a reel 118 positioned in the control cubicle 24. Another cable 120 is connected at the outer end of the cutter assembly and around a horizontally disposed pulley 122 positioned at the far end of the storage structure 10. The cable 120 is then threaded back between the cutter assembly support 50 and the conveyor 16 and wound on to a second reel 124. Both of reels 118 and 124 are rotatably engaged through gears 126 and 128 respectively. The gear 126 is in turn driven by a worm 130 mounted at one end of a motor 132. Accordingly, rotation of the worm 130 in one direction will pull the cutter assembly 14 by cable 116 towards the central cubicle 24 and rotation in the opposite direction will pull it by cable 120 towards the chamber 27 at the other end of the structure 10.

The motors 94 and 104 carried on the moveable support 50 are controlled by electrical wires 134 extending from the cutter assembly 14 over a pulley 136 at the top of the cubicle 24, thence under a weighted pulley 138 and over a pulley 142 adjacent pulley 136 to a switch box 144 at the lower end of the cubicle 24. Switch 144 is for operation of motor 104 and switch 146 mounted on the cubicle adjacent thereto controls motor 94. A switch 148 is provided near switches 144 and 146 for operating the leveling device 12. The motor 48 for the conveyor 16 and the motor 132 for moving the cutter assembly 14 may be operated by self contained switches or additional switches may be mounted in any convenient location such as on the side of the cubicle next to the other switches 144, 146 and 148.

In operation the structure 10 will be filled with bulk material 32 such as corn silage, chopped hay or similar materials. The filling will be through the center filling opening 23 in the top of the roof 22. When the material piles up close to the roof it is pushed to the far ends of the structure by the auger 34 which may be rotated in either direction or operated in one direction by the use of oppositely turned auger blades (right hand blades at one end and left hand blades at the other end.)

As the gases produced by the silage during storage expand during the heat of the day they will move the chamber 27 and return to the material storage area during the night when it is cooler. The important fact is that the silage gases, being heavier than ordinary air, always occupy the space at the bottom of chamber 27 thereby preventing air from entering the silage storage area to cause undesirable molding of the silage.

During removal of the silage material 32 from the storage structure 10 the transfer conveyor 16 and the cutter assembly 14 are operated. When the structure 10 is being filled and during the time the material 32 is being stored therein, the cutter assembly 14 is parked at the end of the trench 20 adjacent the control cubicle 24. The first cut through the material 32 is made with the cutter arm 62 in a vertical position. Generally, the first cut will be made from one end to the other end of the structure 10. When the cutter assembly 14 reaches the far end, the arm 62 is indexed over to remove a cut of sufficient volume and the cutter assembly is moved back to the other end. The material 32 cut is pulled by the implements 76 on the endless chain 68 to the conveyor 16 in the trench 20. The rotating cutter 88 on the front of the cutter assembly 14 cuts away sufficient material for the unit itself to move through the mass of silage.

An alternative cutting procedure is to remove material by rotating the cutter arm 62 back and forth and not traveling to the other end of the first cut. As the cutter arm 62 moves from one side of center to the other side, the cutter chain 68 is reversed in direction of travel. The chain should always move down on the underside of the cutter arm 62.

The fingers 86 extending outwardly from both sides and the edge of the cutter arm 62 increases the depth of the cut and serves to draw more silage back to the conveyor 16.

Some changes may be made in the construction and arrangement of our bulk material storage structure and unloading assembly without departing from the real spirit and purpose of our invention, and it is our intention to cover by our claims, any modified forms of structure or use of mechanical equivalents which may be reasonably included within their scope.

We claim:
1. In a bulk material storage and unloading system, the combination of,
    an elongated storage structure, said storage structure being semi-circular in cross-section;
    a cutter assembly moveable along the floor of said storage structure and adapted to move lengthwise along the longitudinal axis of said structure;
    a cutting arm means provided on said cutter assembly adapted to pivot about the longitudinal axis of said structure from one side to the other side of said cutter assembly, said arm having a length substantially equal to the radius of said semi-circular in cross-section structure;
power means for moving said cutter assembly;
power means for pivoting said cutting arm means;
and a material discharge means for removing material cut by said cutting arm means.

2. In a bulk material storage and unloading system, the combination of,
an elongated storage structure, said storage structure being semi-circular in cross-section;
a cutter assembly moveable along the floor of said storage structure and adapted to move lengthwise along the longitudinal axis of said structure;
an arm means provided on said cutter assembly adapted to pivot from one side to the other side of a center vertical line through said cutter assembly, said arm having a length substantially equal to the radius of said semi-circular in cross-section structure;
an endless cutting band provided on said arm means, said band adapted to revolve around said arm means;
means for revolving said cutting band;
power means for moving said cutter assembly;
power means for pivoting said cutting arm means;
and a material discharge means for removing material cut by said cutting band.

3. In a bulk material storage and unloading system, the combination of,
an elongated storage structure, said storage structure being semi-circular in cross-section;
a cutter assembly moveable along the floor of said storage structure and adapted to move lengthwise along the longitudinal axis of said structure;
an arm means provided on said cutter assembly adapted to pivot from one side to the other side of a center vertical line through said cutter assembly, said arm having a length substantially equal to the radius of said semi-circular in cross-section structure;
an endless cutting band provided on said arm means, said band adapted to revolve around said arm means;
spaced cutting implements provided on said cutting band;
power means for moving said cutter assembly;
power means for pivoting said cutting arm means;
and a material discharge means for removing material cut by said cutting band.

4. In a bulk material storage and unloading system, the combination of,
an elongated storage structure, said storage structure being semi-circular in cross-section;
a cutter assembly moveable along the floor of said storage structure and adapted to move lengthwise along the longitudinal axis of said structure;
an arm means provided on said cutter assembly adapted to pivot from one side to the other side of a center vertical line through said cutter assembly, said arm having a length substantially equal to the radius of said semi-circular in cross-section structure;
an endless cutting band provided on said arm means, said band adapted to revolve around said arm means;
means for revolving said cutting band;
power means for moving said cutter assembly;
power means for pivoting said cutting arm means;
a cutter element rotatably mounted on the forward end of said cutter assembly adjacent the floor of said storage structure;
means for rotating said cutter element;
and a material discharge means for removing material cut by said cutting band and said cutter element.

5. In a bulk material storage and unloading system, the combination of,
an elongated storage structure, said storage structure being semi-circular in cross-section;
a cutter assembly moveable along the floor of said storage structure and adapted to move lengthwise along the longitudinal axis of said structure;
a cutting arm means provided on said cutter assembly adapted to pivot from one side to the other side of said cutter assembly, said arm having a length substantially equal to the radius of said semi-circular in cross-section structure;
power means for moving said cutter assembly;
power means for pivoting said cutting arm means;
a conveyor means extending the length of said structure below said cutter assembly for removing the material cut by said cutting arm means;
and means for driving said conveyor.

6. In a bulk material storage and unloading system, the combination of,
an elongated storage structure, said storage structure being semi-circular in cross-section;
a cutter assembly moveable along the floor of said storage structure and adapted to move lengthwise along the longitudinal axis of said structure;
a cutting arm means provided on said cutter assembly adapted to pivot from one side to the other side of said cutter assembly;
power means for moving said cutter assembly, said arm having a length substantially equal to the radius of said semi-circular in cross-section structure;
power means for pivoting said cutting arm means;
a longitudinal trench provided in the floor of said storage structure, said cutter assembly moveably positioned over said trench;
a conveyor means positioned in said trench and in communication with the outside of said storage structure for removing the material cut by said cutting arm means;
and a means for driving said conveyor.

7. In a bulk material storage and unloading system, the combination of,
an elongated storage structure, said storage structure being semi-circular in cross-section;
a cutter assembly moveably secured to said storage structure and adapted to move along the longitudinal axis of said structure;
an arm means provided on said cutter assembly adapted to pivot from one side to the other side of a center vertical line through said cutter assembly, said arm having a length substantially equal to the radius of said semi-circular in cross-section structure;
an endless cutting band provided on said arm means, said band adapted to revolve lengthwise around said arm means;
means for revolving said cutting band;
power means for moving said cutter assembly;
power means for pivoting said cutting arm means;
and a material discharge means for removing material cut by said cutting band.

8. In a bulk material storage and unloading system, the combination of,
an elongated storage structure, said storage structure being semi-circular in cross-section;
a cutter assembly moveable along the floor of said storage structure and adapted to move lengthwise along the longitudinal axis of said structure;
a cutting arm means provided on said cutter assembly adapted to pivot from one side to the other side of said cutter assembly, said arm having a length substantially equal to the radius of said semi-circular in cross-section structure;
a pair of take up and feed out cable means at one end of said structure;
a first cable secured at one end to said cutter assembly and at the other end to one of said take up and feed out cable means;
a second cable secured at one end to the opposite end of said cutter assembly and at its other end to the second of said take up and let out cable means;
power means for pivoting said cutting arm means;

7 and a material discharge means for removing material cut by said cutting arm means.

9. In a bulk material storage and unloading system, the combination of,
  an elongated storage structure, said storage structure being semi-circular in cross-section;
  a cutter assembly moveable along the floor of said storage structure and adapted to move lengthwise along the longitudinal axis of said structure;
  an arm means provided on said cutter assembly adapted to pivot from one side to the other side of a center vertical line through said cutter assembly, said arm having a length substantially equal to the radius of said semi-circular in cross-section structure;
  an endless cutting band provided on said arm means, said band adapted to revolve lengthwise around said arm means;
  spaced cutting implements provided on said cutting band and transversely arranged relative to the length of said band, said implements extending outwardly transversely of the length of said band on each side of said arm means;
  power means for moving said cutter assembly;
  power means for pivoting said cutting arm means;
  and a material discharge means for removing material cut by said cutting band.

10. In a bulk material storage and unloading system, the combination of,
  an elongated storage structure, said storage structure being semi-circular in cross-section;
  a cutter assembly moveable along the floor of said storage structure and adapted to move lengthwise along the longitudinal axis of said structure;
  a single arm means provided on said cutter assembly adapted to pivot from one side to the other side of a center vertical line through said cutter assembly, said arm having a length substantially equal to the radius of said semi-circular in cross-section structure;
  an endless cutting band provided on said arm means, said band adapted to revolve lengthwise around said arm means;
  spaced cutting implements provided on said cutting band, said implements having a U-shaped support member secured to said band, and cutting fingers extending outwardly from each side of said support member;
  power means for moving said cutter assembly;
  power means for pivoting said cutting arm means;
  and a material discharge means for removing material cut by said cutting band.

11. The structure of claim 8 and a pulley means at the other end of said storage structure, and one of said first and second cables extends around said pulley means between its connections to said cutter assembly and to said take up and feed out means, said take up and feed out means operatively engaging each other whereby as one take up and feed out means is pulling in its cable the other take up and feed out means is feeding out its cable.

References Cited by the Examiner
UNITED STATES PATENTS

| | | | |
|---|---|---|---|
| 1,033,853 | 7/1912 | Wenk | 214—17 X |
| 1,570,172 | 1/1926 | O'Neil | 214—17 |
| 1,675,871 | 7/1928 | Wever | 214—17 X |
| 2,348,056 | 5/1944 | Cheely et al. | 214—17 |
| 2,701,653 | 2/1955 | Gilson | 214—17 |
| 2,704,501 | 3/1955 | Rysdon | 98—55 |
| 2,711,834 | 6/1955 | Broberg et al. | 214—17 |
| 2,717,703 | 9/1955 | Kull et al. | 214—17 |
| 2,746,617 | 5/1956 | Borrowdale | 214—17 |
| 2,782,705 | 2/1957 | Breidert | 98—55 |
| 2,815,134 | 12/1957 | Borrowdale | 214—17 |
| 2,899,884 | 8/1959 | Herbruck. | |
| 3,045,841 | 7/1962 | Skromme | 214—17 |

GERALD M. FORLENZA, *Primary Examiner.*
HUGO O. SCHULZ, *Examiner.*